United States Patent
Li et al.

(10) Patent No.: US 11,496,976 B2
(45) Date of Patent: Nov. 8, 2022

(54) METHOD AND DEVICE FOR SYNCHRONIZATION IN A WIRELESS COMMUNICATION SYSTEM

(71) Applicant: Telefonaktiebolaget LM Ericsson (publ), Stockholm (SE)

(72) Inventors: Gen Li, Beijing (CN); Jianfeng Wang, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 411 days.

(21) Appl. No.: 16/074,084

(22) PCT Filed: Feb. 24, 2018

(86) PCT No.: PCT/CN2018/077119
§ 371 (c)(1),
(2) Date: Jul. 31, 2018

(87) PCT Pub. No.: WO2018/171379
PCT Pub. Date: Sep. 27, 2018

(65) Prior Publication Data
US 2020/0413359 A1    Dec. 31, 2020

(30) Foreign Application Priority Data

Mar. 24, 2017  (CN) .................. PCT/CN2017078077

(51) Int. Cl.
*H04W 56/00* (2009.01)
*H04L 5/00* (2006.01)
*H04W 74/08* (2009.01)

(52) U.S. Cl.
CPC ....... *H04W 56/0015* (2013.01); *H04L 5/0048* (2013.01); *H04W 74/0808* (2013.01)

(58) Field of Classification Search
CPC .......... H04W 56/0015; H04W 74/0808; H04L 5/0048
See application file for complete search history.

(56) References Cited

U.S. PATENT DOCUMENTS

2015/0365945 A1    12/2015  Morioka et al.
2016/0308637 A1*   10/2016  Frenne ................. H04J 11/0069
(Continued)

FOREIGN PATENT DOCUMENTS

JP    2016-510554 A    4/2016
RU    2594892 C2       8/2016
(Continued)

OTHER PUBLICATIONS

3GPP TSG RAN WG1 Meeting #88 R1-1703127 Athens, Greece, Feb. 13-17, 2017; "NR synchronization signal configuration and multiplexing"; Sony (Year: 2017).*
(Continued)

*Primary Examiner* — Benjamin H Elliott, IV
(74) *Attorney, Agent, or Firm* — Nicholson De Vos Webster & Elliott LLP

(57) ABSTRACT

A method and device for synchronization in a wireless communication system. The method includes broadcasting multiple synchronization signal blocks (SSBs) within a same carrier and broadcasting an indicator of system information according to information included in the multiple SSBs. Each of the multiple SSBs is sent on a different set of sub-carriers. Therefore, the demand for fair sharing of spectral resource may be met.

15 Claims, 9 Drawing Sheets

(56) References Cited

U.S. PATENT DOCUMENTS

| | | | |
|---|---|---|---|
| 2017/0353254 A1* | 12/2017 | Islam | H04L 27/2662 |
| 2018/0084593 A1* | 3/2018 | Chen | H04L 5/0048 |
| 2018/0198659 A1* | 7/2018 | Ko | H04L 27/2662 |
| 2018/0199363 A1* | 7/2018 | Lee | H04L 5/0044 |
| 2018/0205585 A1* | 7/2018 | Sadiq | H04L 27/2613 |
| 2018/0227848 A1* | 8/2018 | Lee | H04L 5/0091 |
| 2018/0241494 A1* | 8/2018 | Chendamarai Kannan | H04J 11/0073 |
| 2018/0241526 A1* | 8/2018 | Chendamarai Kannan | H04L 5/0048 |
| 2018/0242223 A1* | 8/2018 | Chendamarai Kannan | H04W 48/08 |
| 2018/0248642 A1* | 8/2018 | Si | H04L 5/0092 |
| 2018/0270772 A1* | 9/2018 | Ly | H04L 5/0053 |
| 2019/0200249 A1* | 6/2019 | Yoon | H04W 24/10 |
| 2019/0319699 A1* | 10/2019 | Lee | H04B 7/2656 |
| 2020/0100214 A1* | 3/2020 | Wei | H04L 1/0041 |
| 2020/0229152 A1* | 7/2020 | Park | H04L 1/00 |
| 2020/0413356 A1* | 12/2020 | Wang | H04W 56/0015 |
| 2020/0413359 A1* | 12/2020 | Li | H04L 5/0094 |

FOREIGN PATENT DOCUMENTS

| | | | |
|---|---|---|---|
| WO | 2016047513 A1 | 3/2016 | |
| WO | 2017004774 A1 | 1/2017 | |
| WO | WO-2018171379 A1 * | 9/2018 | H04W 56/0015 |

OTHER PUBLICATIONS

3GPP TSG RAN WG1 Meeting #88 R1-1701574 Athens, Greece Feb. 13-17, 2017; "NR-SS: Frequency Raster"; ZTE (Year: 2017).*
3GPP TSG RAN WG1 Meeting #88 R1-1701577 Athens, Greece Feb. 13-17, 2017; "NR-PBCH Design"; ZTE (Year: 2017).*
3GPP TSG RAN WG1 Meeting #88 R1-1701712 Athens, Greece, Feb. 13-17, 2017; "Frequency location of the synchronization signals"; Huawei et al. (Year: 2017).*
3GPP TSG RAN WG1 Meeting #88 R1-1701937 Athens, Greece, Feb. 13-17, 2017; "Discussion on SS block related design for NR"; Guangdong OPPO Mobile Telecom (Year: 2017).*
3GPP TSG RAN WG1 Meeting #88 R1-1702063 Athens, Greece, Feb. 13-17, 2017; "NR PBCH and NR physical channel carried system information"; CATT (Year: 2017).*
3GPP TSG RAN WG1 Meeting #88 R1-1702319 Athens, Greece Feb. 13-17, 2017; "Considerations on NR-PBCH and System Information Delivery"; InterDigital Communications (Year: 2017).*
3GPP TSG-RAN WG1 NR #88 R1-1702586 Feb. 13-17, 2017 Athens, Greece; "Synchronization signal frequency raster considerations"; Qualcomm (Year: 2017).*
3GPP TSG-RAN WG1 #88 R1-1702589 Feb. 13-17, 2017 Athens, Greece; "PBCH design considerations"; Qualcomm (Year: 2017).*
3GPP TSG RAN WG1 Meeting #88 R1-1702902 Athens, Greece Feb. 13-17; "Remaining issues of SS frequency raster"; Samsung (Year: 2017).*
International Preliminary Report on Patentability for Application No. PCT/CN2018/077119, dated Jul. 17, 2019, 9 pages.
Takeda K., "Status Report to TSG," 3GPP TSG RAN Meeting #74, RP-162201, Dec. 5-8, 2016, 148 pages.
Astri et al., "Efficient design of SS block", 3GPP TSG-RAN WG1 #87, R1-1612289, Reno, US, Nov. 14-18, 2016, 7 pages.
CMCC, "Discussions on transmission bandwidth and multiplexing of synchronization signals", 3GPP TSG RAN WG1 NR Ad-Hoc Meeting, R1-1701070, Spokane, USA, Jan. 16-20, 2017, 9 pages.
Supplementary European Search Report and Search Opinion, EP App. No. 18742893.3, Dec. 17, 2019, 9 pages.
Office Action, RU App. No. 2019133788/07, dated Apr. 14, 2020, 7 pages of Original Document Only.
International Search Report and Written Opinion for Application No. PCT/CN2018/077119, dated May 16, 2018, 10 pages.
Samsung, "Discussion on Sync. Signal Considering Forward Compatibility Aspects," 3GPP TSG RAN WG1 #86, R1-166744, Aug. 22-26, 2016, 4 pages.
Notice of Allowance, RU App. No. 2019133788/07, dated Jul. 14, 2020, 9 pages (Original Document Only).
Huawei et al., "WF on SS burst set composition and SS block Index Indication", 3GPP TSG RAN WG1 Meeting #88 R1-1703832, Jan. 13-17, 2017, 10 pages.
Notice of Reasons for Rejection, JP App. No. 2019-551937, Jan. 19, 2021, 8 pages (4 pages of English Translation and 4 pages of Original Document).
NTT DOCOMO, Inc., "Discussion on NR-PBCH design", 3GPP TSG RAN WG1 Meeting #88, R1-1702827, Feb. 13-17, 2017, 10 pages.
NTT DOCOMO, Inc., "Summary of [87-36]: Mini-slot designs for NR", 3GPP TSG RAN WG1 AH_NR Meeting, R1-1700617, Jan. 16-20, 2017, 26 pages.
NTT DOCOMO, Inc., "Views on wider bandwidth operations for NR", 3GPP TSG RAN WG1 Meeting #88, R1-1702802, Feb. 13-17, 2017, 7 pages.
Office Action, EP App. No. 18742893.3, dated Apr. 14, 2021, 6 pages.
Grant of Patent, KR App. No. 10-2019-7027904, dated Jan. 28, 2021, 4 pages (2 pages of English Translation and 2 pages of Original Document).
Notice of Reasons for Refusal, JP App. No. 2019-551937, dated Sep. 21, 2021, 6 pages (3 pages of English Translation and 3 pages of Original Document).
Notification of Reason for Refusal, KR App. No. 10-2019-7027904, dated Jul. 31, 2020, 5 pages (3 pages of English Translation and 2 pages of Original Document).
Office Action, AR App. No. 20180100680, dated Aug. 26, 2021, 6 pages of Original Document Only.
Office Action, ID App. No. P00201907449, dated Oct. 7, 2021, 8 pages (3 pages of English Translation and 5 pages of Original Document).
Communication pursuant to Article 94(3) EPC, EP App. No. 18742893.3, dated Sep. 7, 2022, 5 pages.

* cited by examiner

METHOD AND DEVICE FOR SYNCHRONIZATION IN A WIRELESS COMMUNICATION SYSTEM

CROSS-REFERENCE TO RELATED APPLICATIONS

This application is a National stage of International Application No. PCT/CN2018/077119, filed Feb. 24, 2018, which claims priority to International Application No. PCT/CN2017/078077, filed Mar. 24, 2017, which are hereby incorporated by reference.

TECHNICAL FIELD

Embodiments of the present disclosure generally relate to the field of communications, and more particularly, to a method and device for synchronization in a wireless communication system.

BACKGROUND

This section introduces aspects that may facilitate better understanding of the present disclosure. Accordingly, the statements of this section are to be read in this light and are not to be understood as admissions about what is in the prior art or what is not in the prior art.

Mobile broadband will continue to drive some demands for big overall traffic capacity and huge achievable end-user data rates in a wireless access network. Several scenarios in the future may require data rates of up to 10 Gbps in local areas. These demands for very high system capacity and very high end-user date rates may be met by networks with distances between access nodes ranging from a few meters in indoor deployments up to roughly 50 m in outdoor deployments, i.e. with an infrastructure of which density is considerably higher than the current densest networks.

Such networks are regarded as new radio (NR) systems which is currently studied in $3^{rd}$ generation partnership project (3GPP). Besides traditional licensed exclusive bands, NR systems are also expected to be operating on unlicensed bands especially for enterprise solutions.

A synchronization signal (SS) block is defined and termed as "SS block" or "SSB" in the latest NR standardization, including a main static and periodical synchronization signal and part of minimum system information. In a SS block, a primary synchronization signal (PSS) and a second synchronization signal (SSS) may be always included to provide downlink synchronization. In addition, the part of minimum system information may also be delivered in the SS block as a physical broadcast channel (PBCH) according to the current 3GPP discussion and agreements.

SUMMARY

In an existing solution of SS block transmission, one format for the SS block transmission is that only one SS block is sent at a same time within a carrier in a licensed band. However, it has been found that the format may not meet a demand for fair sharing of spectral resource in an unlicensed band because an occupied band width of the carrier is relatively low, and transmission power for the SS block is low.

In order to solve at least part of the above problems, methods, apparatus, devices and computer programs are provided in the present disclosure. It may be appreciated that embodiments of the present disclosure are not limited to a wireless system operating in NR network, but could be more widely applied to any application scenario where similar problems exist.

Various embodiments of the present disclosure mainly aim at providing methods, devices and computer programs for controlling a transmission between a transmitter and a receiver, for example, in a shared frequency band. Either of the transmitter and the receiver could be, for example, a terminal device or a network device. Other features and advantages of embodiments of the present disclosure will also be understood from the following description of specific embodiments when reading in conjunction with the accompanying drawings, which illustrate, by way of example, the principles of embodiments of the present disclosure.

In general, embodiments of the present disclosure provide a solution for synchronization in a wireless communication system. In the embodiments, multiple SSBs in the same carrier are transmitted at the same time, so that the demand for fair sharing of spectral resource may be met.

In a first aspect, there is provided a method for synchronization in a wireless communication system. The method includes: broadcasting multiple synchronization signal blocks (SSBs) within a same carrier, and each of the multiple SSBs is sent on a different set of sub-carriers; and broadcasting an indicator of system information according to information included in the multiple SSBs.

In one embodiment, the information included in the multiple SSBs indicates that a frequency location of the corresponding SSB aligns with a frequency location of the corresponding indicator of system information.

In one embodiment, the information included in each of the multiple SSBs indicates a frequency location of the corresponding indicator of system information through a frequency offset with respect to the sub-carrier on which the corresponding SSB is sent or with respect to a unified reference frequency.

In one embodiment, the information included in each of the multiple SSBs indicates a frequency location of the corresponding indicator of system information through a grid number of the indicator of system information.

In one embodiment, the multiple SSBs are broadcast in a same time slot. In a further embodiment, the SSBs are sent with different beam-forming directions.

In one embodiment, the method may further include: performing listen before talk (LBT) for both of data transmission and SSB transmission for a symbol which is used as start of data and SSB transmission.

In a second aspect, there is provided a method for synchronization in a wireless communication system. The method includes: receiving multiple SSBs on respective set of sub-carriers which belong to a same carrier; decoding information included in at least one of the received multiple SSBs in the same carrier; and determining an indicator of system information according to the decoded information.

In one embodiment, receiving multiple SSBs which belong to the same carrier includes: keeping searching for, when at least one SSB has been detected, another SSB in near frequency; and judging whether the SSBs that have been detected were sent on the same carrier.

In one embodiment, judging whether the SSBs have been detected were sent on the same carrier includes one or more of: checking if the detected SSBs are in a same planning channel; and judging if cell identities detected from the detected SSBs are the same.

In one embodiment, determining an indicator of system information includes: determining the indicator of system information according to decoded information of each of the received multiple SSBs, respectively; determining the indicator of system information according to decoded information of each of the received multiple SSBs; determining the indicator of system information according to decoded information of any one of the received multiple SSBs; or performing combine of the decoded information of the received multiple SSBs, and determining the indicator of system information according to the combined information, when the decoded information has the same reference frequency.

In a third aspect, there is provide a network device including a processor and a memory. The memory contains instructions executable by the processor whereby the network device is operative to: broadcast multiple synchronization signal blocks (SSBs) within a same carrier, and broadcast an indicator of system information according to information included in the multiple SSBs. Each of the multiple SSBs is sent on a different set of sub-carriers.

In a fourth aspect, there is provided a terminal device including a processor and a memory. The memory contains instructions executable by the processor whereby the terminal device is operative to: receive multiple SSBs on respective set of sub-carriers which belong to a same carrier; decode information included in at least one of the multiple SSBs in the same carrier; and determine an indicator of system information according to the decoded information.

In a fifth aspect, there is provided a communications system. The system includes a terminal device and a network device; the network device is configured to broadcast multiple synchronization signal blocks (SSBs) within a same carrier, and broadcast an indicator of system information according to information included in the multiple SSBs, wherein each of the multiple SSBs is sent on a different set of sub-carriers.

The terminal device is configured to receive multiple SSBs on respective set of sub-carriers which belong to a same carrier, decode information included in at least one of the multiple SSBs in the same carrier, and determine an indicator of system information according to the decoded information.

According to various embodiments of the present disclosure, multiple SSBs in the same carrier are transmitted at the same time in terms of frequency division multiplexing (FDM). Therefore, the demand for fair sharing of spectral resource may be met.

BRIEF DESCRIPTION OF THE DRAWINGS

The above and other aspects, features, and benefits of various embodiments of the disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which.

DETAILED DESCRIPTION

Figure 1:
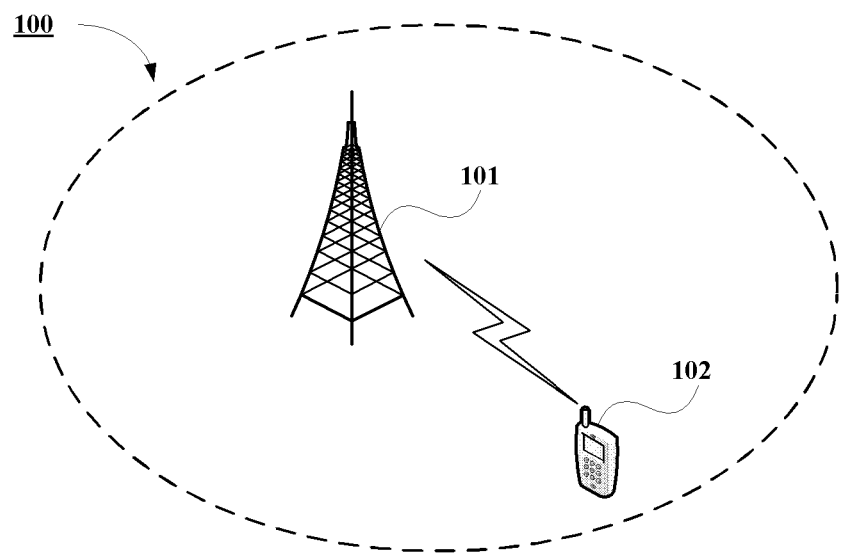
FIG. 1 shows a schematic diagram of a wireless communication network 100.

The present disclosure will now be discussed with reference to several example embodiments. It should be understood that these embodiments are discussed only for the purpose of enabling those skilled persons in the art to better understand and thus implement the present disclosure, rather than suggesting any limitations on the scope of the present disclosure.

As used herein, the term "wireless communication network" refers to a network following any suitable communication standards, such as LTE-Advanced (LTE-A), LTE, Wideband Code Division Multiple Access (WCDMA), High-Speed Packet Access (HSPA), and so on. Furthermore, the communications between a terminal device and a network device in the wireless communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) communication protocols, and/or any other protocols either currently known or to be developed in the future.

The term "network device" refers to a device in a wireless communication network via which a terminal device accesses the network and receives services therefrom. The network device refers a base station (BS), an access point (AP), or any other suitable device in the wireless communication network. The BS may be, for example, a node B (NodeB or NB), an evolved NodeB (eNodeB or eNB), or a next generation Node B (gNB), a Remote Radio Unit (RRU), a radio header (RH), a remote radio head (RRH), a relay, a low power node such as a femto, a pico, and so forth.

Yet further examples of the network device may include multi-standard radio (MSR) radio equipment such as MSR BSs, network controllers such as radio network controllers (RNCs) or base station controllers (BSCs), base transceiver stations (BTSs), transmission points, transmission nodes. More generally, however, the network device may represent any suitable device (or group of devices) capable, configured, arranged, and/or operable to enable and/or provide a terminal device access to the wireless communication network or to provide some service to a terminal device that has accessed the wireless communication network.

The term "terminal device" refers to any end device that can access a wireless communication network and receive services therefrom. By way of example and not limitation, the terminal device refers to a mobile terminal, user equipment (UE), or other suitable devices. The UE may be, for example, a Subscriber Station (SS), a Portable Subscriber Station, a Mobile Station (MS), or an Access Terminal (AT). The terminal device may include, but not limited to, portable computers, image capture terminal devices such as digital cameras, gaming terminal devices, music storage and playback appliances, a mobile phone, a cellular phone, a smart phone, a tablet, a wearable device, a personal digital assistant (PDA), a vehicle, and the like.

The term such as "network device" and "terminal device" should be considered non-limiting and does in particular not imply a certain hierarchical relation between the two; in general "network device" could be considered as device 1 and "terminal device" could be considered as device 2 and these two devices communicate with each other over some radio channel.

As used herein, the terms "first" and "second" refer to different elements. The singular forms "a" and "an" are intended to include the plural forms as well, unless the context clearly indicates otherwise. The terms "comprises," "comprising," "has," "having," "includes" and/or "including" as used herein, specify the presence of stated features, elements, and/or components and the like, but do not preclude the presence or addition of one or more other features, elements, components and/or combinations thereof. The term "based on" is to be read as "based at least in part on." The term "one embodiment" and "an embodiment" are to be read as "at least one embodiment." The term "another embodiment" is to be read as "at least one other embodiment." Other definitions, explicit and implicit, may be included below.

Although terminology from 3GPP NR has been used in this disclosure, this should not be limiting the scope of the disclosure to only the abovementioned systems. Other wireless systems may also benefit from exploiting the ideas covered within this disclosure.

In this disclosure, all these embodiments could be used for other use cases such as licensed operation although it is motivated for NR unlicensed operation.

Now some exemplary embodiments of the present disclosure will be described below with reference to the figures.

FIG. 1 shows a schematic diagram of a wireless communication network 100. FIG. 1 illustrates a network device 101 and a terminal device 102 in the wireless communication network. In the example of FIG. 1, the network device 101 may provide services to the terminal device 102. The traffic between the network device 101 and the terminal device 102 may be URLLC (ultra-reliable and low latency communication) traffic, eMBB (enhanced mobile broadband) traffic, or mMTC (massive machine type communication) traffic, and so on.

It is to be understood that the configuration of FIG. 1 is described merely for the purpose of illustration, without suggesting any limitation as to the scope of the present disclosure. Those skilled in the art would appreciate that the wireless communication network 100 may include any suitable number of terminal devices and/or network devices and may have other suitable configurations.

First Aspect of Embodiments

A method for synchronization in a wireless communication system is provided in an embodiment. The method is implemented at a network device as an example.

Figure 2:
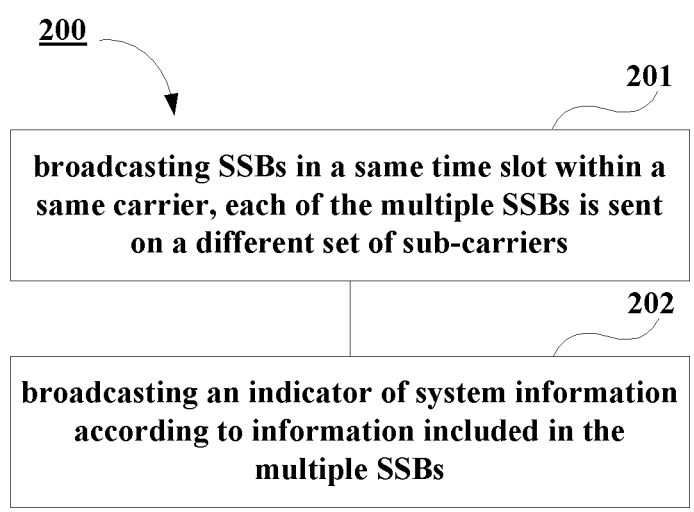
FIG. 2 is a diagram which shows a method 200 for synchronization in a wireless communication system.

FIG. 2 is a diagram which shows a method 200 for synchronization in a wireless communication system in accordance with an embodiment of the present disclosure, and illustrates the method for synchronization in a wireless communication system by taking a network device as an example.

As shown in FIG. 2, the method 200 includes, broadcasting multiple synchronization signal blocks (SSBs) in a same time slot within a same carrier in block 201. Each of the multiple SSBs is sent on a different sub-carrier, or more precisely, because a bandwidth need for a SSB transmission might be larger than that of a subcarrier, each of the multiple SSBs is sent on a different set of sub-carriers.

In an embodiment, the carrier of the network device may correspond to a cell which is working on the carrier. However, it is not limited thereto. Furthermore, the SSBs may be transmitted in an unlicensed band, but it is not limited thereto, for example, the SSBs may also be transmitted in a licensed band.

In an embodiment, a demand for fair sharing of spectral resource may be met by transmitting multiple SSBs at the same time slot within the same carrier.

In an embodiment, when multiple SSBs in the same carrier are sent in a NR band, the multiple SSBs may occupy more channel bandwidth than one SSB, no matter the NR band is an unlicensed band or a licensed band.

For example, it is assumed that there is 20 MHz bandwidth for a carrier (may also be referred to as a carrier bandwidth), there are 4.32 MHz bandwidth for a SSB (may also be referred to as a SSB bandwidth) with 30 kHz subcarrier spacing. If only one SSB is configured in the carrier, the ratio for the occupied channel bandwidth by the one SSB is 4.32/20=21.6%<80%, wherein an aspect of the regulation requirements as "occupied channel bandwidth" enforced for 5 GHz carriers according to ETSI 301 893, as an example. While if 4 SSBs are configured in the same carrier, the ratio for the occupied channel bandwidth by the 4 SSBs is 4.32*4/20=86.4%>80%. Therefore the ratio for multiple SSBs in a carrier is higher than that for one SSB in a carrier, and a regulation requirement of occupied channel bandwidth may be satisfied.

In the embodiment, the transmission power for multiple SSBs is larger than that for one SSB due to the ratio for the occupied channel bandwidth is higher, although power spectral density (PSD) is limited. PSD is an average transmission power per bandwidth unit. If only one SSB is sent in the carrier at a same time slot, when the maximum power spectral density is limited as required by the network system, for example, maximum PSD requirements are enforced in US regulation for 5 and 3.5 GHz, the SSB transmission power is low so that detection and decoding of SSB becomes not reliable. If the SSB could not be detected in one time, the terminal has to wait for a long time to synchronize, which increase the initial access delay. Beside, when the SSB transmission power is low, other nodes may determine the channel for SSB transmission is idle when performing listen-before-talk and thus transmit simultaneously. Then consequent transmission may suffer large interference.

For example, PSD of a single SS block transmission is 13 W/Hz. If there are two SS blocks are transmitted simultaneously within a carrier, the sum would be, for example 16 W/Hz, which is easier for detection and decoding. Therefore, when transmission of multiple SSBs in a same slot within a same carrier are applied, although PSD requirement is not exceeded, detection and decoding of the multiple SSBs becomes more reliable, thus initial access delay may be decreased. Besides, consequent transmissions may suffer less interference.

In the embodiment, as shown in FIG. 2, the method 200 further includes, broadcasting an indicator of system information according to information included in the multiple SSBs in block 202.

In the embodiment, due to block 202, system information may be found according to the indicator of system information in a receiving device (such as a terminal device).

In the embodiment, the indicator of system information may indicate location of system information block. The indicator of system information may indicate a common search space or a physical downlink control channel (PDCCH). Alternatively, the indicator of system information may also be system information block (SIB) itself.

In a further embodiment, information included in the multiple SSBs according to which system information is found may be PBCH in each of the multiple SSBs, which indicates frequency location of the indicator of system information. Alternatively, the information included in the multiple SSBs may also include time offset information of the indicator of system information.

In an embodiment, a primary synchronization signal (PSS) and/or a second synchronization signal (SSS) may be included in the SSB to provide downlink synchronization.

Figure 3:
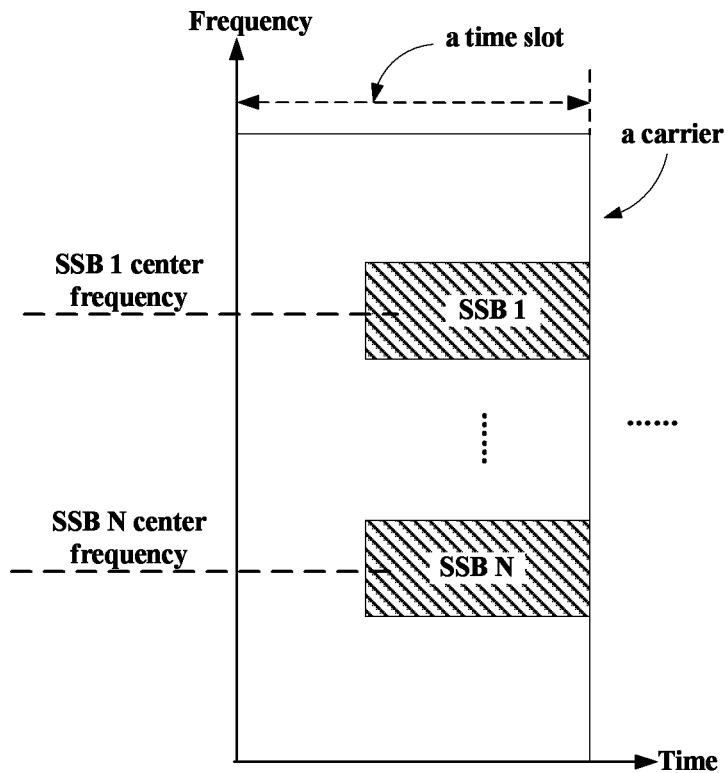
FIG. 3 is a diagram which shows an example of broadcasting multiple SSBs in accordance with an embodiment of the present disclosure.

FIG. 3 is a diagram which shows an example of broadcasting multiple SSBs in accordance with an embodiment of the present disclosure.

As shown in FIG. 3, SSB 1~SSB N may be broadcasted at the same time slot (may also be a symbol/subframe/frame, and so on), SSB 1~SSB N belong to the same carrier and each of SSB 1~SSB N is sent on a different sub-carrier, i.e. SSB 1~SSB N may be sent in terms of frequency division multiplexing (FDM). N is an integer, and N>1. Axis X in FIG. 3 represent time domain and axis Y represents frequency domain. In time domain, tit may be SS burst set with multiple SS blocks in different time slots, and the different time slots may be consecutive or intersected. In frequency domain, multiple SS blocks are broadcast in a same time slot. In the embodiment, center frequency of each SSB may meet SS frequency raster rules so that the receiving device (such as UE) may detect it.

In the embodiment, in each of the multiple SSBs, a same PSS and/or a same SSS may be used, and the information is used to indicate a starting time point of each SSB, so that the receiving device may synchronize to a boundary of a time unit (such as, a symbol/slot/subframe/frame). In NR, SSB may not be started with fixed symbol as LTE, i.e. symbol 0 or 5. So a time-index information need to indicate this SSB is starting with which symbol so that UE can sync to slot boundary.

In the embodiment, the time offset information of the indicator of system information may be the same in the multiple SS blocks (i.e. SSB1 and SSB2).

In an embodiment, frequency location of the indicator of system information may be indicated by using many manners. In the following description, two SSBs may be taken as examples to describe, but it is limited thereto, SSBs in a carrier may be more than two in other embodiments.

As one example, the frequency location of each SSB may align with the frequency of indicator of system information, so that the frequency location of each SSB may implicitly convey the frequency location of the indicator of system information.

Figure 4:
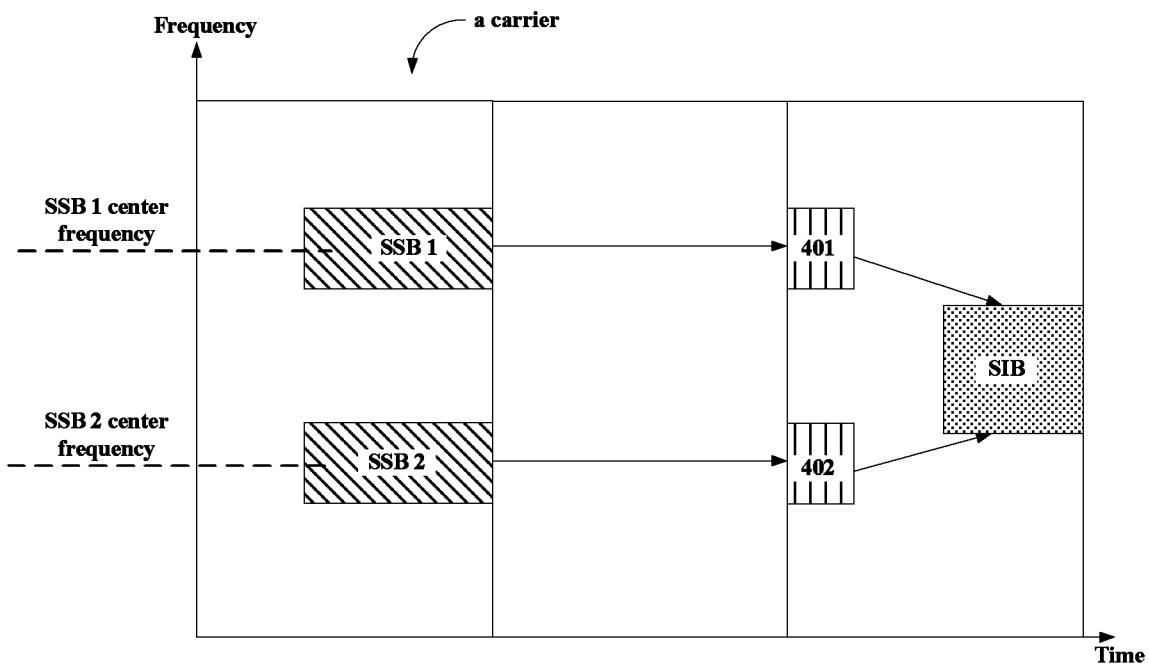
FIG. 4 is a diagram which shows an example of frequency location of the indicator of system information.

FIG. 4 is a diagram which shows an example of frequency location of the indicator of system information.

As shown in FIG. 4, the center frequency of SSB 1 and SSB 2 aligns with the corresponding indicators of system information 401 and 402, respectively. Indicators of system information 401 and 402 both indicate the location of system information block (SIB), so that UE can get the frequency location of PDCCH or common search space through the multiple SSBs received on broadcasting channel, and thus obtains the location of SIB to get the system information and performs synchronization.

In the embodiment, multiple search indicators of system information may be available as shown in FIG. 4.

In an embodiment, different SSBs in different frequency location may indicate the frequency location of indicator of system information independently.

For example, each of the multiple SSBs indicates a frequency location of the indicator of system information through a frequency offset with respect to different reference frequency. The different reference frequency may be the frequency of sub-carrier on which the each of the multiple SSBs is sent.

Figure 5:
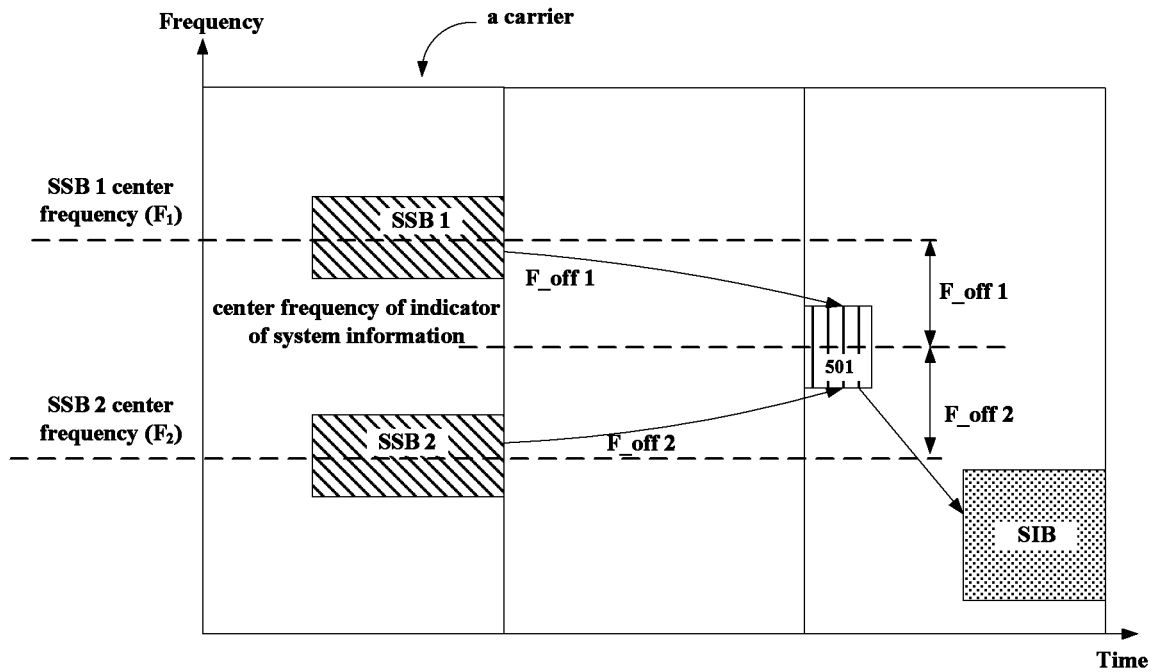
FIG. 5 is a diagram which shows another example of frequency location of the indicator of system information.

FIG. 5 is a diagram which shows another example of frequency location of the indicator of system information.

As shown in FIG. 5, a reference frequency $F_1$ for SSB 1 may be a center frequency of a sub-carrier on which SSB 1 is sent, and the frequency offset of the indicator of system information 501 with respect to $F_1$ is denoted as F_off 1. The F_off 1 may be included in SSB 1, for example in the PBCH of the SSB 1.

In this example, a reference frequency $F_2$ for SSB 2 may be a center frequency of a sub-carrier on which SSB 2 is sent, and the frequency offset of the indicator of system information 501 with respect to $F_2$ is denoted as F_off 2. The F_off 2 may be included in SSB 2, for example in the PBCH of the SSB 2.

In the embodiment, one search indicator of system information would be needed as shown in FIG. 5.

In an embodiment, different SSBs in different frequency location may indicate the frequency location of the indicator of system information through a same frequency offset.

For example, each of the multiple SSBs indicates a frequency location of the indicator of system information through a frequency offset with respect to a unified reference frequency.

Figure 6:
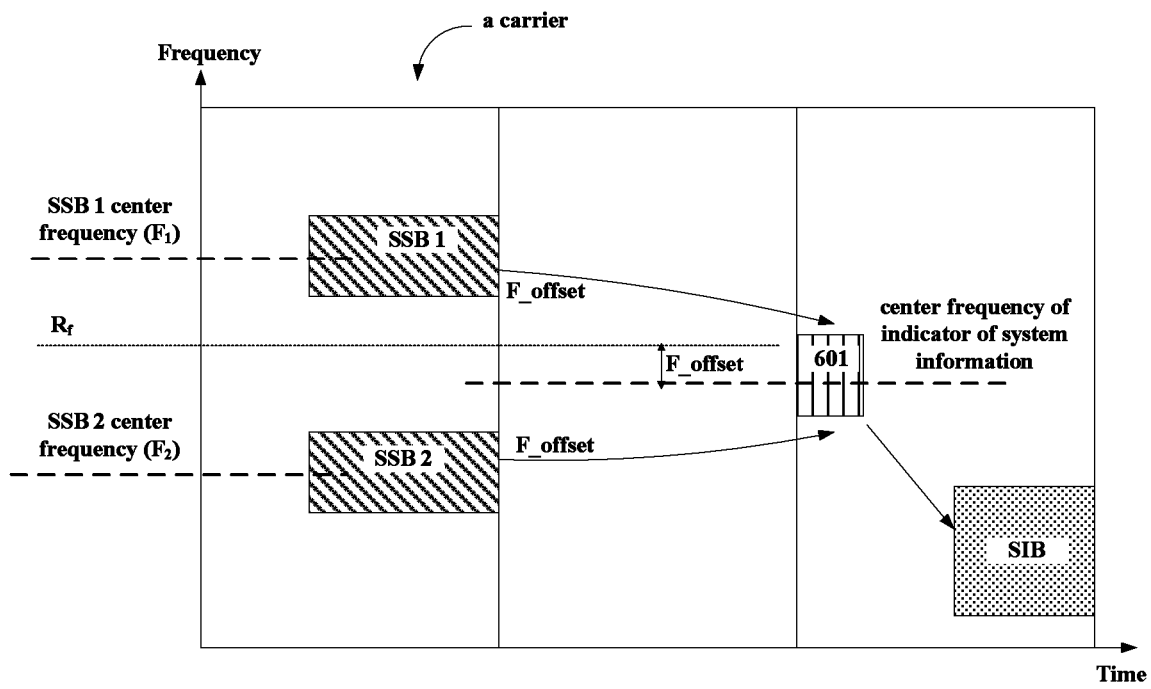
FIG. 6 is a diagram which shows another example of frequency location of the indicator of system information.

FIG. 6 is a diagram which shows another example of frequency location of the indicator of system information.

As shown in FIG. 6, $F_1$ is a center frequency of a set of sub-carriers on which SSB 1 is sent, $F_2$ is a center frequency of a set of sub-carriers on which SSB 2 is sent, $R_f$ is the unified reference frequency, the frequency offset of the indicator of system information 601 with respect to $R_f$ is denoted as F_offset. The F_offset may be included in SSB 1 and SSB 2, for example in the PBCH of the SSB 1 and the PBCH of the SSB 2.

In the embodiment, the unified reference frequency $R_f$ may be calculated according to a function based on frequency locations of the multiple of SSBs. Frequency location of each SSB may be the center frequency of the subcarrier on which the SSB is sent.

As one example, the function may be expressed as $R_f = f(F_1, \ldots, F_i, \ldots, F_M)$ where $F_i$ is the frequency location of a $i^{th}$ SSB. For example, the function may be $R_f = (F_1 + \ldots + F_i + \ldots + F_M)/M$. For another example, the reference frequency $R_f$ may be the middle frequency for the upper and lower SSBs, i.e. $R_f = (F_1 + F_M)/2$ as illustrated in FIG. 6. It should be appreciated that the expression of the $R_f$ is not limited thereto, other manners may be adopted according to an actual scenario.

The benefit of the example in FIG. 6 compared to the example in FIG. 5 may lie in that frequency offset is the same so that soft combining to decode PBCH by UE side is possible; therefore, the soft combining may increase the reliability.

In an embodiment, an absolute frequency location of indicator of system information in the multiple SSBs may be used.

For example, the carrier band may be numbered with a basic band grid. A grid number may be set corresponding to a frequency location. In the embodiment, the frequency location of indicator of system information may be indicated through the grid number. The grid number may be inserted in PBCH of each SSB. Once one SSB is detected, the frequency location, i.e., center of the indicator of system information, may be derived by the receiver from the grid number.

It should be appreciated that anyone or combination of the above examples or embodiments may be used to indicate the frequency location of indicator of system information. But it is not limited thereto, for example, other examples or manners may be used according to an actual scenario.

In an embodiment, the multiple SSBs in a same slot may be sent with different beam-forming directions when digital or hybrid beam-forming is available.

In an embodiment, listen before talk (LBT) may be performed for both of data transmission and SSB transmission.

Figure 7:
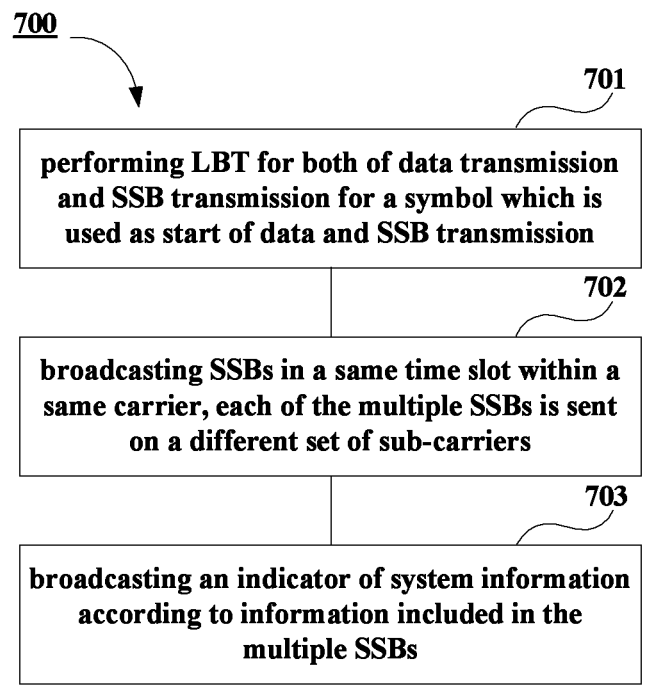
FIG. 7 is a diagram which shows a method 700 for synchronization in a wireless communication system.

FIG. 7 is a diagram which shows a method 700 for synchronization in a wireless communication system in accordance with an embodiment of the present disclosure, and illustrates the method for synchronization in a wireless communication system by taking a network device as an example.

As shown in FIG. 7, the method 700 for synchronization in the wireless communication system includes: performing listen before talk (LBT) for both of data transmission and SSB transmission for a symbol which is used as start of data and SSB transmission at block 703.

As shown in FIG. 7, the method 700 further includes: broadcasting multiple synchronization signal blocks (SSBs) in a same time slot within a same carrier in block 702. Each of the multiple SSBs is sent on a different set of sub-carriers.

As shown in FIG. 7, the method 700 may further include: broadcasting an indicator of system information according to information included in the multiple SSBs in block 703.

In an embodiment, SSB transmission should be performed after LBT is successfully. For example, a short clear channel assessment (CCA) of 25 us need to be performed to proceed the SSB transmission. If there is also a need for simultaneous data transmission for example to a specific terminal device, LBT for data transmission will also be performed, perhaps in a longer period of time and at least partially overlapped with the CCA for SSB LBT. Till LBT for data transmission and LBT for SSB transmission are both successful, data and SSBs will be multiplexed. And then multiple SSBs are sent on broadcast channel and data is sent on data channel.

In the embodiment, SSB transmission may be started at several symbols instead of slot boundary only. And data transmission may also be started inside a slot if the device is configured with mini-slot.

By utilization of these features of SSB transmission and data transmission, the block 701 may be performed to make sure SSB transmission successful as soon as possible while increasing resource efficiency.

In the embodiment, the symbols may be divided into different kinds, i.e. some may be used as start of data transmission for some terminal devices (such as UEs) with configuration of mini-slot. For SS block transmission, it may be transmitted in any symbol.

Figure 8:
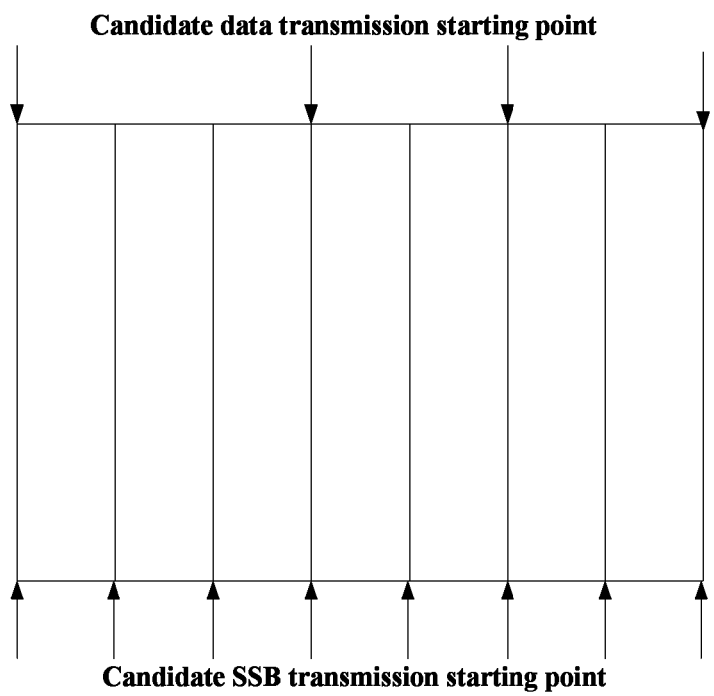
FIG. 8 is a diagram which shows an example for candidate transmission starting point in the embodiment.

FIG. 8 is a diagram which shows an example for candidate transmission starting point in the embodiment. As shown in FIG. 8, starting point for data transmission may be in the $3^{rd}$ and $5^{th}$ symbols, if UE is configured with mini-slot. Starting point for SSB transmission may be in any symbol.

In an embodiment, as shown in FIG. 8, LBT for SSB transmission may be performed for any symbol, because any symbol may be starting point for SSB transmission. For example, The LBT for SSB transmission may be a short CCA of 25 us.

In the embodiment, as shown in FIG. 8, LBT for data transmission may be performed for the $3^{rd}$ and $5^{th}$ symbols, because the $3^{rd}$ and $5^{th}$ symbols may be starting points for data transmission. The LBT for data transmission may be a cat 4 LBT, and the details of the cat 4 LBT may be referred to an existing scheme, such as the latest ETSI 301 893 regulations.

In an embodiment, if LBT for data transmission is successful, SSBs may be multiplexed with data. Otherwise only SSBs may be sent.

Figure 9:
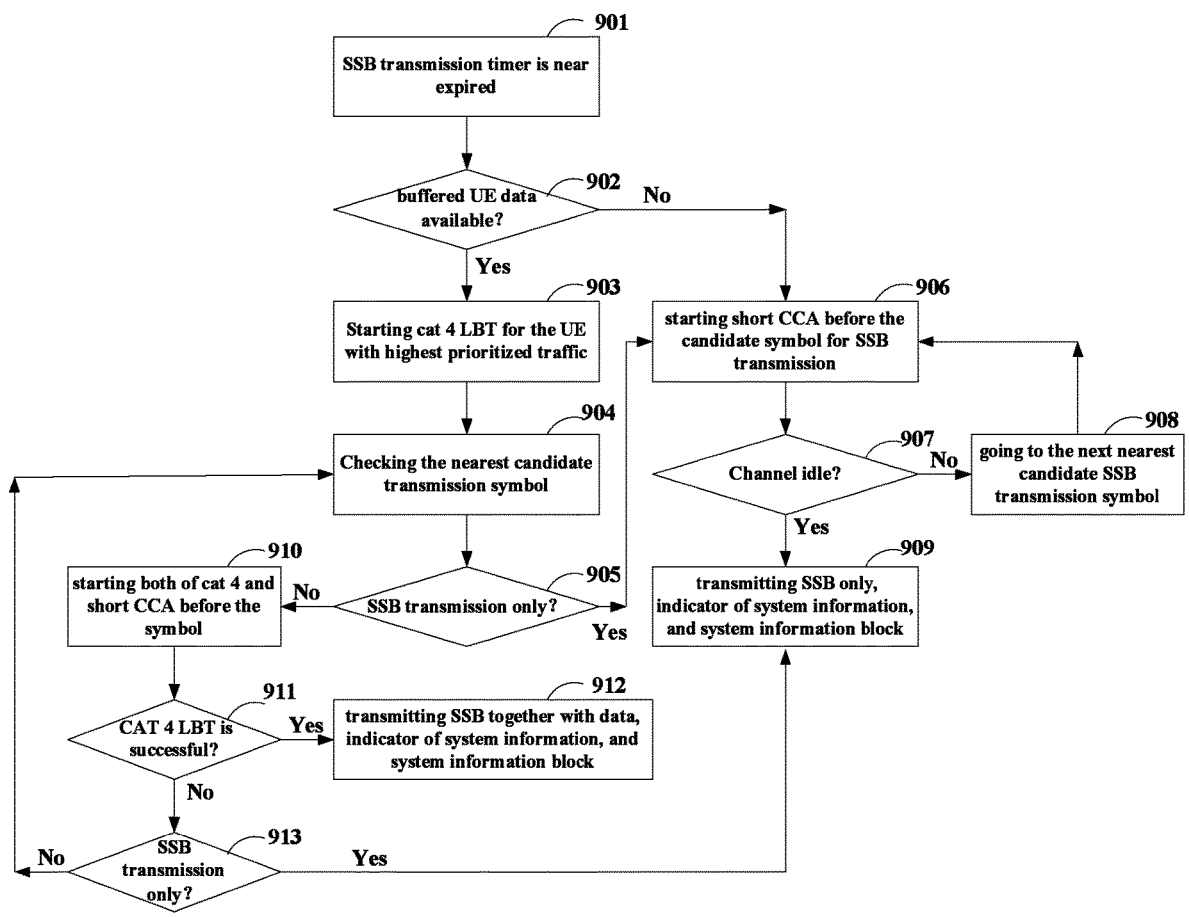
FIG. 9 is a diagram which shows an example for LBT-based SSB transmission in the embodiment.

FIG. 9 is a diagram which shows an example for LBT-based SS block transmission in the embodiment. FIG. 9 includes following blocks:

Block 901: Determining that SSB transmission timer is near expired;

Block 902: Judging if buffered UE data is available. If yes, go to block 903; if no, go to block 906;

Block 903: Starting cat 4 LBT for the UE with highest prioritized traffic;

Block 904: Checking the nearest candidate transmission symbol;

Block 905: Judging if the symbol (in block 904) is only for SSB transmission. If yes, for example, the $4^{th}$ symbol, go to block 906; if no, for example, the $3^{rd}$ symbol, go to block 910.

Block 906: starting short CCA before the candidate symbol for SSB transmission;

Block 907: Judging if the channel is idle. If yes, go to block 909; if no, go to block 908;

Block 908: going to the next nearest candidate SSB transmission symbol;

Block 909: transmitting SSB only according to block 201 in the FIG. 2, transmitting indicator of system information according to block 202 in the FIG. 2, and transmitting system information block in sequence;

Block 910: starting both of cat 4 and short CCA before the symbol;

Block 911: judging if CAT 4 LBT is successful. If yes, go to block 912; if no, go to block 913;

Block 912: transmitting SSB together with data, transmitting indicator of system information, and transmitting system information block in sequence;

Block 913: judging if short CCA is successful. If yes, go to block 909; if no, go to block 904.

It should be appreciated that FIG. 9 is only an example of the disclosure, but it is not limited thereto. For example, the order of operations at blocks 901-913 may be adjusted and/or some blocks may be omitted. Moreover, some blocks not shown in FIG. 9 may be added.

As can be seen from the above embodiments, the demand for fair sharing of spectral resource may be met by transmitting multiple SSBs at the same time slot within the same carrier. Besides, LBT for both data transmission and SSB transmission may be performed to make sure SSB transmission successful as soon as possible while increasing resource efficiency.

Second Aspect of Embodiments

A method for synchronization in a wireless communication system is provided in an embodiment. The method is implemented at a terminal device as an example, and the same contents as those in the first aspect of embodiments are omitted.

Figure 10:
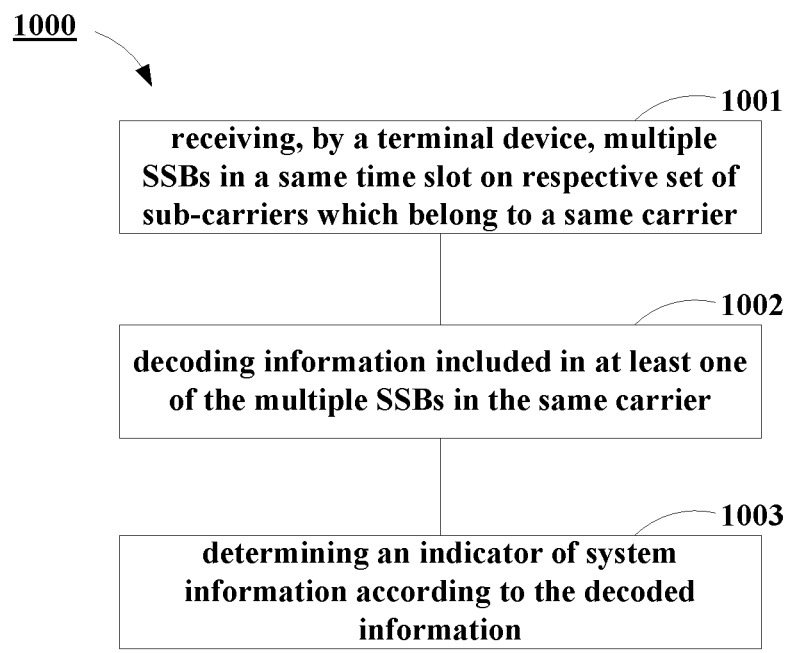
FIG. 10 is a diagram which shows a flowchart of a method 900 for synchronization in a wireless communication system in accordance with an embodiment of the present disclosure.

FIG. 10 shows a flowchart of a method 1000 for synchronization in a wireless communication system in accordance with an embodiment of the present disclosure, and illustrates the method for synchronization in a wireless communication system by taking a terminal device as an example.

As shown in FIG. 10, the method 1000 includes: receiving, by a terminal device, multiple SSBs in a same time slot on respective set of sub-carriers which belong to a same carrier at block 1001; decoding information included in at least one of the multiple SSBs in the same carrier at block 1002; and, determining an indicator of system information according to the decoded information at block 1003.

In an embodiment, at block 1001, the terminal device may receive the multiple SSBs which were broadcasted by the network device according to the first aspect of embodiments.

In an embodiment, the terminal device may not only receive multiple SS blocks, but also receive the indicator of system information according to at least one of the received SSBs, and then the system information according to the received indicator.

In an embodiment, more likely needed in circumstance illustrated in FIG. 6, the block 1001 include: when at least one SSB has been detected, keeping searching for another simultaneously received SSB in near frequency; and judging whether the SSBs that have been found were sent on the same carrier.

In an embodiment, there may be several manners to check whether the simultaneously received SSBs that have been found were sent on the same carrier.

As one example, the terminal device may check if the multiple SSBs are in the same planning channel. For example, in 5 GHz, there are planning for each channel so that it could be determined if the multiple SSBs in the same planning 20 MHz channel.

As another example, the terminal device may judge whether the PHY cell identities from different SS blocks are the same. If the same PHY cell ID is detected from different SSBs which have small gap in frequency domain, the terminal device may determine these SSBs were sent on the same carrier.

Each of the two examples or both of the two examples may be used. But it is not limited thereto, other embodiments or manners may also be used.

In another embodiment, when the terminal device checked one or more SSBs are sent in a same time slot, it does not need to continue checking other SSBs in the multiple SSBs broadcasted simultaneously in a same carrier by the eNB. Circumstances illustrated by FIG. 4 or FIG. 5 can fit this solution.

In an embodiment, PBCH is included in the SSB. Frequency location of indicator of system information may be included in the PBCH. When signal strength is not high enough and one SSB detected may not enough for decoding, two SSBs are detected by the terminal device and information in PBCH of those two SSBs are enough for decoding. Time offset information of indicator of system information, a primary synchronization signal (PSS) and/or a second synchronization signal (SSS) may be also included in the SSB to provide downlink synchronization.

In an embodiment, at block 1002, the terminal device may decode information included in at least one of the multiple SSBs in the same carrier. For example, when any one of examples in FIGS. 3-6 has been used in the multiple SSBs in the same carrier, information included in each one of the multiple SSBs may be decoded.

For another example, when any one of examples in FIGS. 4-6 has been used in the multiple SSBs in the same carrier, information included in each one of the multiple SSBs may indicate the same frequency location of indicator of system information, thus decoding one SSB would be enough.

In an embodiment, indicator of system information may indicate location of system information block. Indicator of system information may be a common search space or a PDCCH. Indicator of system information may also be system information block (SIB) itself.

In an embodiment, at block 1003, the terminal device may determine the indicator of system information according to the decoded information.

For example, when each one of the simultaneously sent and then detected multiple SSBs has been decoded, the terminal device may find the indicator of system information according to the decoded information of each one of the multiple SSBs, respectively.

For another example, when the example in FIG. 5 or the example in FIG. 6 has been used in the multiple SSBs in the same carrier, the decoded information has the same reference frequency, thus the terminal device may perform soft combining of the information decoded from the multiple SSBs, and find the indicator of system information according to the combined information.

For another example, when only one SSB is decoded to obtain the decode information, the terminal device may find the indicator of system information according to the decoded information.

Figure 11:
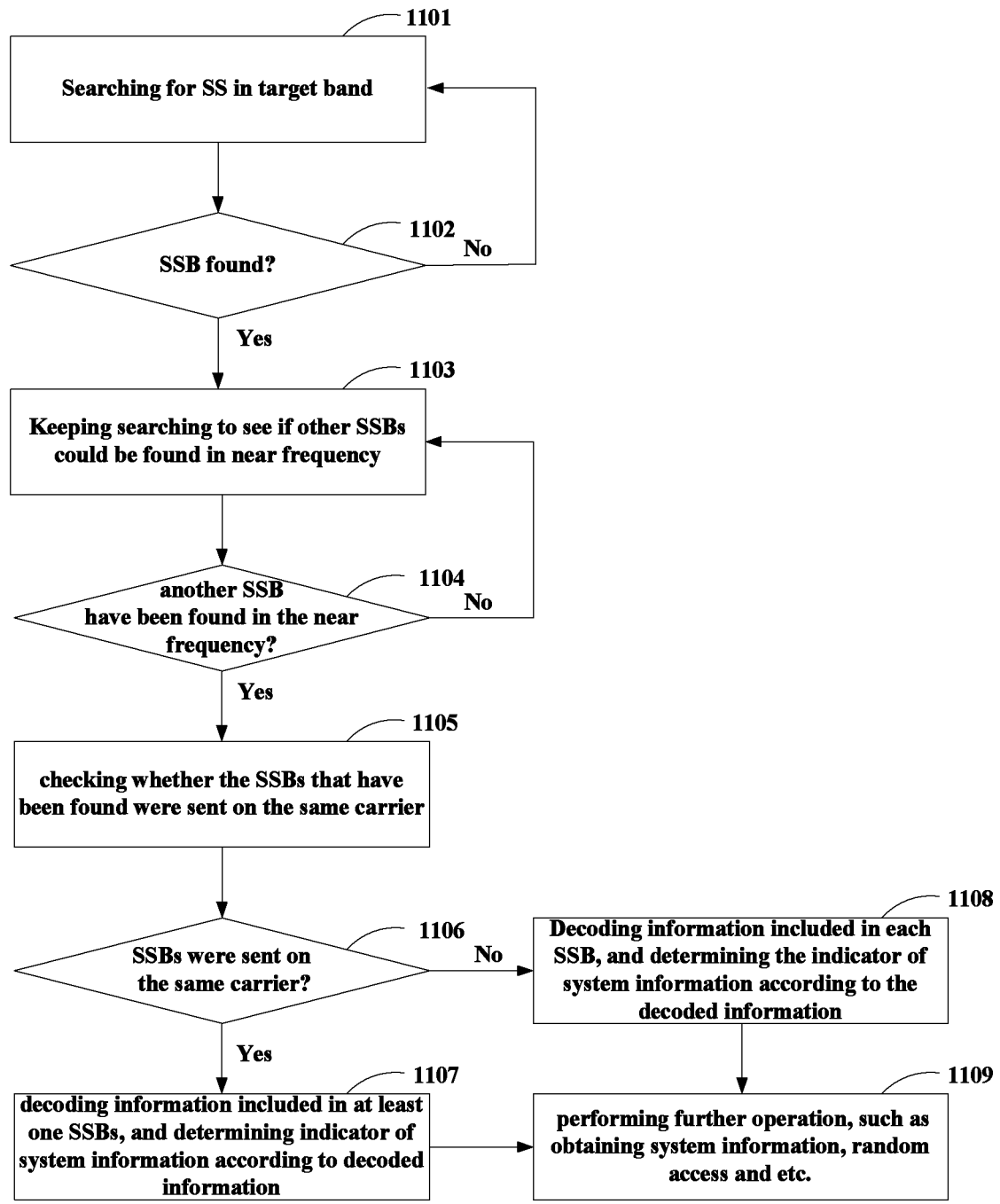
FIG. 11 is a diagram which shows an example for synchronization in a wireless communication system in the embodiment.

FIG. 11 is a diagram which shows an example for synchronization in a wireless communication system in the embodiment. FIG. 11 includes following blocks:

Block 1101: Searching for SSB in target band;

Block 1102: Judging if any SSB is found, if yes, go to block 1103; if no, go back to block 1101;

Block 1103: Keeping searching to see if other SSBs could be found in near frequency;

Block 1104: Judging if another SSB have been found in the near frequency, if yes, go to block 1105, if no, go back to block 1103;

Block 1105: checking whether the SSBs that have been found were sent on the same carrier;

Block 1106: Judging the checking result of block 1105, if yes, go to block 1107, if no, go to block 1108;

Block 1107: Decoding information included in at least one of the multiple SSBs, and determining the indicator of system information according to the decoded information;

Block 1108: Decoding information included in each SSB, and determining the indicator of system information according to the decoded information;

Block 1109: performing further operation, such as obtaining system information, random access and etc.

It should be appreciated that FIG. 11 is only an example of the disclosure, but it is not limited thereto. For example, the order of operations at blocks 1101-1109 may be adjusted and/or some blocks may be omitted. Moreover, some blocks not shown in FIG. 11 may be added.

As can be seen from the above embodiments, the demand for fair sharing of spectral resource may be met by transmitting multiple SSBs at the same time slot within the same carrier.

Third Aspect of Embodiments

An apparatus for synchronization in a wireless communication system is provided in an embodiment. The apparatus may be configured in the network device 101, and the same contents as those in the first or second aspect of embodiments are omitted.

Figure 12:
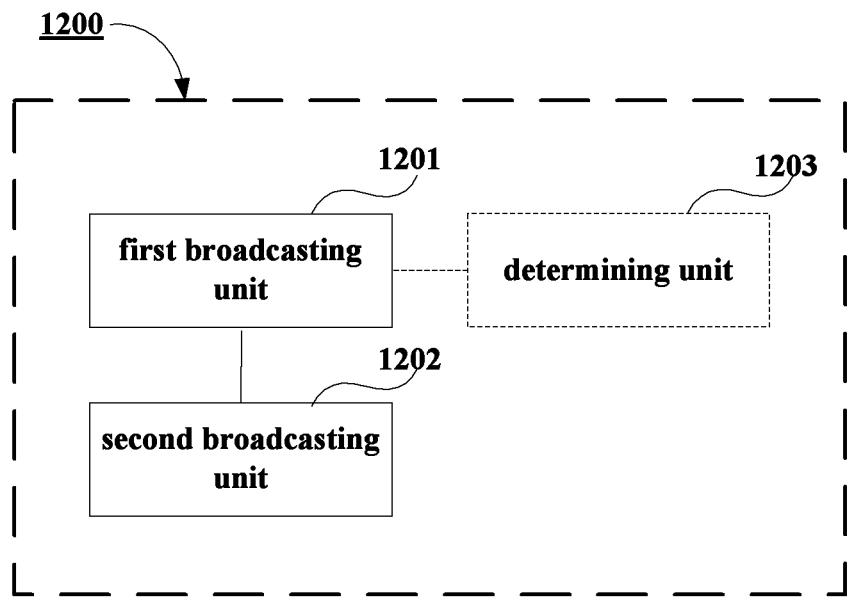
FIG. 12 is a block diagram of an apparatus for synchronization in a wireless communication system in accordance with an embodiment of the present disclosure.

FIG. 12 shows a block diagram of an apparatus 1200 for synchronization in a wireless communication system in accordance with an embodiment of the present disclosure.

As shown in FIG. 12, the apparatus 1200 includes a first broadcasting unit 1201 configured to broadcast multiple synchronization signal blocks (SSBs) in a same time slot within a same carrier; and a second broadcasting unit 1202 to broadcast an indicator of system information according to information included in the multiple SSBs. Each of the multiple SSBs is sent on a different set of sub-carriers.

In an embodiment, a frequency location of each SSB may align with the indicator of system information.

In an embodiment, each of the multiple SSBs indicates a frequency location of the indicator of system information through a frequency offset with respect to the sub-carrier on which the each of the multiple SSBs is sent or with respect to one unified reference frequency.

In an embodiment, each of the multiple SSBs indicates a frequency location of the indicator of system information through a grid number of the indicator of system information.

In an embodiment, the multiple SSBs in the same time slot are sent with different beam-forming directions.

In an embodiment, as shown in FIG. 12, the apparatus 1200 may further include a determining unit 1203 configured to perform listen before talk (LBT) for both of data transmission and SSB transmission for a symbol which is used as start of data and SSB transmission.

It should be appreciated that components included in the apparatus 1200 correspond to the operations of the method 200 or 700. Therefore, all operations and features described above with reference to FIG. 2 or 7 are likewise applicable to the components included in the apparatus 1200 and have similar effects. For the purpose of simplification, the details will be omitted.

It should be appreciated that the components included in the apparatus 1200 may be implemented in various manners, including software, hardware, firmware, or any combination thereof.

In an embodiment, one or more units may be implemented using software and/or firmware, for example, machine-executable instructions stored on the storage medium. In addition to or instead of machine-executable instructions, parts or all of the components included in the apparatus 1200 may be implemented, at least in part, by one or more hardware logic components.

For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

The apparatus 1200 may be a part of a device. But it is not limited thereto, for example, the apparatus 1200 may be the network device 101, other parts of the network device 101, such as transmitter and receiver, are omitted in the FIG. 12.

As can be seen from the above embodiments, the demand for fair sharing of spectral resource may be met by transmitting multiple SSBs at the same time slot within the same carrier. Besides, LBT for both data transmission and SSB transmission may be performed to make sure SSB transmission successful as soon as possible while increasing resource efficiency.

Fourth Aspect of Embodiments

An apparatus for synchronization in a wireless communication system is provided in an embodiment. The apparatus may be configured in the terminal device 102, and the same contents as those in the first and second aspect of embodiments are omitted.

Figure 13:
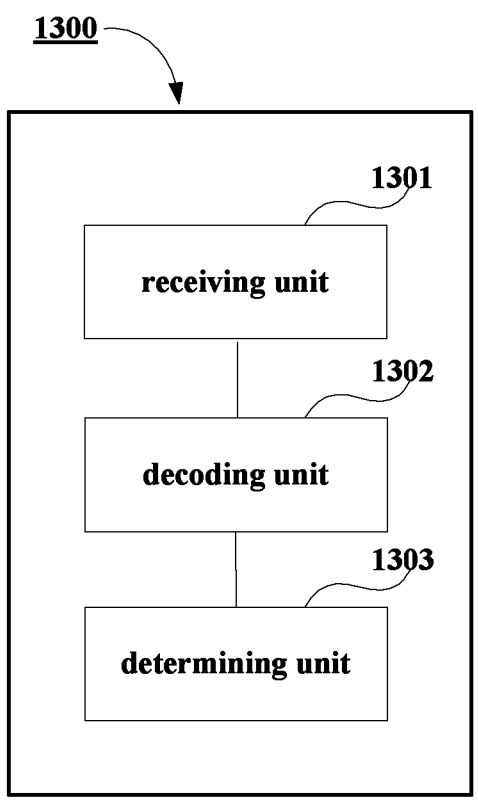
FIG. 13 is a block diagram of an apparatus for synchronization in a wireless communication system in accordance with an embodiment of the present disclosure.

FIG. 13 shows a block diagram of an apparatus 1300 for synchronization in a wireless communication system in accordance with an embodiment of the present disclosure.

As shown in FIG. 13, the apparatus 1300 includes a receiving unit 1301 configured to receive multiple SSBs in a same time slot on respective set of sub-carriers which belong to a same carrier; a decoding unit 1302 configured to decode information included in at least one of the multiple SSBs in the same carrier; and a determining unit 1303 configured to determine an indicator of system information according to the decoded information.

In an embodiment, the receiving unit 1301 may include a searching unit (not shown in FIG. 13) configured to keep searching for another simultaneously received SSB in near frequency when at least one SSB has been found; and a judging unit (not shown in FIG. 13) configured to judge whether the simultaneously received SSBs that have been found were sent on the same carrier.

In an embodiment, the judging unit may be configured to check if these SSBs are in the same planning channel and/or judge if cell Identities detected from these SSBs are the same, so as to judge whether the SSBs that have been found belong to the same carrier.

In an embodiment, the determining unit 1203 may be configured to determine the indicator of system information according to decoded information of each one of the multiple SSBs, respectively; or perform combining of the decoded information of the multiple SSBs, and determine the indicator of system information according to the combined information, when the decoded information has the same reference frequency, so as to determine the indicator of system information.

It should be appreciated that components included in the apparatus 1300 correspond to the operations of the method 1000. Therefore, all operations and features described above with reference to FIG. 10 are likewise applicable to the components included in the apparatus 1300 and have similar effects. For the purpose of simplification, the details will be omitted.

It should be appreciated that the components included in the apparatus 1300 may be implemented in various manners, including software, hardware, firmware, or any combination thereof.

In an embodiment, one or more units may be implemented using software and/or firmware, for example, machine-executable instructions stored on the storage medium. In addition to or instead of machine-executable instructions, parts or all of the components included in the apparatus 1300 may be implemented, at least in part, by one or more hardware logic components.

For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

The apparatus 1300 may be a part of a device. But it is not limited thereto, for example, the apparatus 1300 may be the terminal device 102, other parts of the terminal device 102, such as transmitter and receiver, are omitted in the FIG. 13.

As can be seen from the above embodiments, the demand for fair sharing of spectral resource would be met by transmitting multiple SSBs at the same time slot within the same carrier.

Fifth Aspect of Embodiments

A communications system is provided, as shown in FIG. 1, the communication system 100 includes a terminal device 102 and a network device 101.

A device (such as a terminal device 102 or a network device 101) is provided in an embodiment, and the same contents as those in the first aspect and the second aspect of embodiments are omitted.

Figure 14:
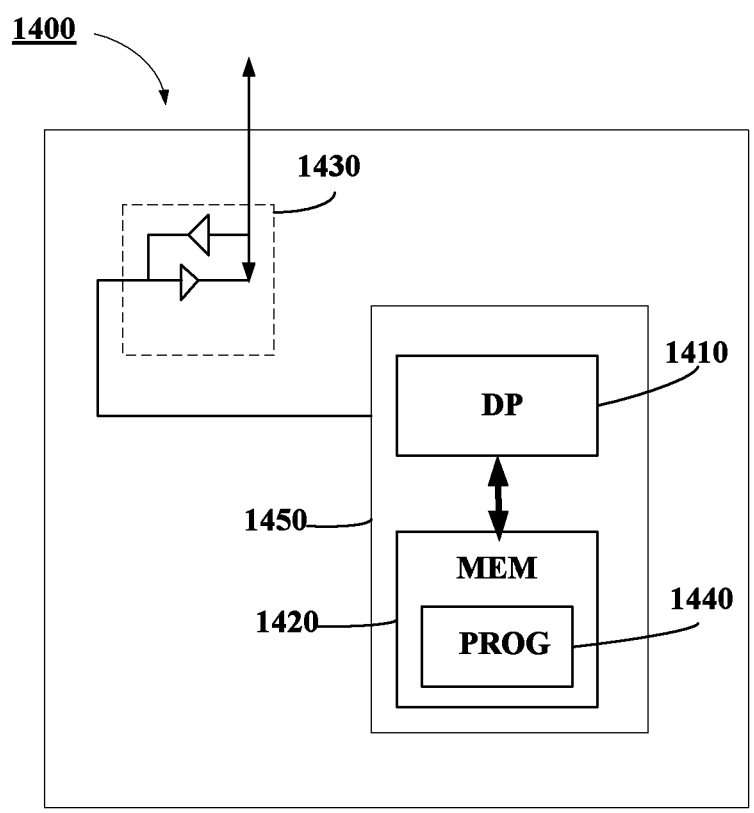
FIG. 14 shows a simplified block diagram of a device that is suitable for implementing embodiments of the present disclosure.

FIG. 14 shows a simplified block diagram of a device 1400 that is suitable for implementing embodiments of the present disclosure. It would be appreciated that the device 1400 may be implemented as at least a part of, for example, the network device 101 or the terminal device 102.

As shown, the device 1400 includes a communicating means 1430 and a processing means 1450. The processing means 1450 includes a data processor (DP) 1410, a memory (MEM) 1420 coupled to the DP 1410. The communicating means 1430 is coupled to the DP 1410 in the processing means 1450. The MEM 1420 stores a program (PROG) 1440. The communicating means 1430 is for communications with other devices, which may be implemented as a transceiver for transmitting/receiving signals.

In some embodiments, the device 1400 acts as a network device. For example, the memory 1420 stores a plurality of instructions and the processor 1410 is coupled to the memory 1420 and configured to execute the instructions for: the network device to broadcast multiple synchronization signal blocks (SSBs) in a same time slot within a same carrier, and broadcast an indicator of system information according to information included in the multiple SSBs. Each of the multiple SSBs is sent on a different set of sub-carriers.

In some other embodiments, the device 1400 acts as a terminal device. For example, the memory 1420 stores a plurality of instructions and the processor 1410 is coupled to the memory 1420 and configured to execute the instructions to: receive multiple SSBs on respective set of sub-carriers which belong to a same carrier, decode information included in at least one of the multiple SSBs in the same carrier, and determine an indicator of system information according to the decoded information.

The PROG 1440 is assumed to include program instructions that, when executed by the associated DP 1410, enable the device 1400 to operate in accordance with the embodiments of the present disclosure, as discussed herein with the method 200 or 1000. The embodiments herein may be implemented by computer software executable by the DP 1410 of the device 1400, or by hardware, or by a combination of software and hardware. A combination of the data processor 1410 and MEM 1420 may form processing means 1450 adapted to implement various embodiments of the present disclosure.

The MEM 1420 may be of any type suitable to the local technical environment and may be implemented using any suitable data storage technology, such as semiconductor based memory devices, magnetic memory devices and systems, optical memory devices and systems, fixed memory and removable memory, as non-limiting examples. While only one MEM is shown in the device 1400, there may be several physically distinct memory modules in the device 1400. The DP 1410 may be of any type suitable to the local technical environment, and may include one or more of general purpose computers, special purpose computers, microprocessors, digital signal processors (DSPs) and processors based on multicore processor architecture, as non-limiting examples. The device 1400 may have multiple processors, such as an application specific integrated circuit chip that is slaved in time to a clock which synchronizes the main processor.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing devices. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

By way of example, embodiments of the present disclosure can be described in the general context of machine-executable instructions, such as those included in program modules, being executed in a device on a target real or virtual processor. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general-purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine-readable medium, which may be any tangible medium that may contain, or store a program for use by or in connection with an instruction execution system, apparatus, or device. The machine-readable medium may be a machine-readable signal medium or a machine-readable storage medium. The machine-readable medium may include but not limited to an electronic, magnetic, optical, electromagnetic, infrared, or semiconductor system, apparatus, or device, or any suitable combination of the foregoing.

More specific examples of the machine-readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

In the context of this disclosure, the device may be implemented in the general context of computer system-executable instructions, such as program modules, being executed by a computer system. Generally, program modules may include routines, programs, objects, components, logic, data structures, and so on that perform particular tasks or implement particular abstract data types. The device may be practiced in distributed cloud computing environments where tasks are performed by remote processing devices that are linked through a communications network. In a distributed cloud computing environment, program modules may be located in both local and remote computer system storage media including memory storage devices.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method for synchronization in a wireless communication system, comprising:
   broadcasting a plurality of synchronization signal blocks (SSBs), wherein the plurality of SSBs are sent on a set of sub-carriers of a carrier and wherein offset information included in each of the SSBs indicates a frequency offset to location of an indicator, which indicator indicates a frequency location or search location where system information block (SIB) can be located;
   broadcasting the indicator; and
   broadcasting the SIB at the frequency location or the search location indicated by the indicator,
   wherein a receiving device detects one of the plurality of SSBs, searches for, when the one SSB has been detected, another SSB in near frequency until successful detection, determines whether multiple SSBs that have been detected were sent on a same carrier, decodes the offset information to determine the location of the indicator, and decodes the indicator to locate the frequency location or the search location of the SIB.

2. The method according to claim 1, wherein the plurality of SSB s broadcasted within the carrier are in a same time slot.

3. The method according to claim 2, wherein the plurality of SSB s are sent with different beam-forming directions.

4. The method according to claim 1, wherein the method further comprising:
   performing listen before talk (LBT) for both of data transmission and SSB transmission for a symbol which is used as start of data and SSB transmission.

5. A method for synchronization in a wireless communication system, comprising:
   detecting, by a terminal device, one of a plurality of synchronization signal blocks (SSBs), wherein the plurality of SSBs are sent on a set of sub-carriers of a carrier and wherein offset information included in each of the SSBs indicates a frequency offset to a location of an indicator, which indicator indicates a frequency location or search location where a system information block (SIB) can be located;
   searching for, when the one SSB has been detected, another SSB in near frequency until successful detection;
   determining whether multiple SSBs that have been detected were sent on a same carrier;
   decoding the offset information included in at least one of the SSBs sent on the same carrier to determine the location of the indicator; and
   detecting and decoding the indicator to locate the frequency location or the search location of the SIB.

6. The method according to claim 5 further comprising one or more of:
   checking if multiple detected SSBs are in a same planning channel; and
   judging if cell identities detected from the multiple detected SSB s are the same.

7. The method according to claim 5, wherein the determining the location of the indicator further comprising:
   determining the location of the indicator according to decoded offset information of the multiple detected SSBs.

8. The method according to claim 5, wherein the plurality of SSBs which belong to the same carrier are in a same time slot.

9. A network device for synchronization in a wireless communication system, comprising:
   a processor; and
   a memory containing instructions which, when executed by the processor, cause the network device to perform operations to:
   broadcast a plurality of synchronization signal blocks (SSBs), wherein the plurality of SSBs are sent on a set of sub-carriers of a carrier and wherein offset information included in each of the SSBs indicates a frequency offset to a location of an indicator, which indicator indicates a frequency location or search location where system information block (SIB) can be located;
   broadcast the indicator; and
   broadcast the SIB at the frequency location or the search location indicated by the indicator,
   wherein a receiving device detects one of the plurality of SSBs, searches for, when the one SSB has been detected, another SSB in near frequency until successful detection, determines whether multiple SSBs that have been detected were sent on a same carrier, decodes the offset information to determine the location of the indicator, and decodes the indicator to locate the frequency location or the search location of the SIB.

10. The network device according to claim 9, wherein the plurality of SSBs broadcasted within the carrier are in a same time slot.

11. The network device according to claim 9, wherein the network device is operative to broadcast the plurality of SSBs in different beam-forming directions.

12. A terminal device for synchronization in a wireless communication system, comprising:
 a processor; and
 a memory containing instructions which, when executed by the processor, cause the terminal device to perform operations to:
  detect one of a plurality of synchronization signal blocks (SSBs), wherein the plurality of SSBs are sent on a set of sub-carriers of a carrier and wherein offset information included in each of the SSB s indicates a frequency offset to a location of an indicator, which indicator indicates a frequency location or search location where a system information block (SIB) can be located;
  search for, when the one SSB has been detected, another SSB in near frequency until successful detection;
  determine whether multiple SSBs that have been detected were sent on a same carrier;
  decode the offset information included in at least one of the SSBs sent on the same carrier to determine the location of the indicator; and
  detect and decode the indicator to locate the frequency location or the search location of the SIB.

13. The terminal device according to claim 12, wherein the terminal device is operative to judge whether the SSBs that have been detected were sent on the same carrier by performing one or more operations to:
  check if detected SSBs are in a same planning channel; and
  judge if cell identities detected from the detected SSBs are the same.

14. The terminal device according to claim 12 operative to determine the location of the indicator by performing operations to:
  determine the location of the indicator according to decoded offset information from the multiple detected SSBs.

15. The terminal device according to claim 12, wherein the plurality of SSBs which belong to the same carrier are in a same time slot.

* * * * *

UNITED STATES PATENT AND TRADEMARK OFFICE
CERTIFICATE OF CORRECTION

PATENT NO. : 11,496,976 B2  
APPLICATION NO. : 16/074084  
DATED : November 8, 2022  
INVENTOR(S) : Li et al.

Page 1 of 2

It is certified that error appears in the above-identified patent and that said Letters Patent is hereby corrected as shown below:

On the Title Page

In Item (30), under "Foreign Application Priority Data", in Column 1, Line 2, delete "PCT/CN2017078077" and insert -- PCT/CN2017/078077 --, therefor.

In the Specification

In Column 1, Line 33, delete "date" and insert -- data --, therefor.

In Column 1, Line 61, delete "band width" and insert -- bandwidth --, therefor.

In Column 3, Line 10, delete "provide" and insert -- provided --, therefor.

In Column 4, Line 52, delete "a" and insert -- to a --, therefor.

In Column 4, Line 60, delete "(MSR) radio" and insert -- (MSR) --, therefor.

In Column 6, Line 28, delete "the" and insert -- whether the --, therefor.

In Column 6, Line 55, delete "in" and insert -- at --, therefor.

In Column 6, Line 57, delete "Beside," and insert -- Besides, --, therefor.

In Column 7, Line 39, delete "tit" and insert -- it --, therefor.

In Column 9, Line 42, delete "block 703." and insert -- block 701. --, therefor.

In Column 9, Line 51, delete "successfully." and insert -- successful. --, therefor.

In Column 9, Line 53, delete "the" and insert -- with the --, therefor.

Signed and Sealed this  
Fourth Day of July, 2023

Katherine Kelly Vidal  
*Director of the United States Patent and Trademark Office*

CERTIFICATE OF CORRECTION (continued)
U.S. Pat. No. 11,496,976 B2

In Column 10, Line 1, delete "transmission" and insert -- transmission is --, therefor.

In Column 11, Lines 5-6, delete "transmission" and insert -- transmission is --, therefor.

In Column 11, Line 66, delete "not" and insert -- not be --, therefor.

In Column 13, Line 64, delete "System-on-a-chip systems (SOCs)," and insert -- System-on-a-chip (SOC) systems, --, therefor.

In Column 14, Lines 7-8, delete "transmission" and insert -- transmission is --, therefor.

In Column 15, Line 3, delete "System-on-a-chip systems (SOCs)," and insert -- System-on-a-chip (SOC) systems, --, therefor.

In the Claims

In Column 17, Line 54, in Claim 1, delete "to" and insert -- to a --, therefor.

In Column 18, Line 2, in Claim 2, delete "SSB s" and insert -- SSBs --, therefor.

In Column 18, Line 5, in Claim 3, delete "SSB s" and insert -- SSBs --, therefor.

In Column 18, Line 36, in Claim 6, delete "SSB s" and insert -- SSBs --, therefor.

In Column 19, Line 19, in Claim 12, delete "SSB s" and insert -- SSBs --, therefor.